United States Patent
Harney et al.

(10) Patent No.: US 8,229,733 B2
(45) Date of Patent: Jul. 24, 2012

(54) METHOD AND APPARATUS FOR LINGUISTIC INDEPENDENT PARSING IN A NATURAL LANGUAGE SYSTEMS

(76) Inventors: John Harney, Kings Park, NY (US); Janet Dwyer, Kings Park, NY (US)

(*) Notice: Subject to any disclaimer, the term of this patent is extended or adjusted under 35 U.S.C. 154(b) by 1499 days.

(21) Appl. No.: 11/351,182

(22) Filed: Feb. 9, 2006

(65) Prior Publication Data
US 2007/0185702 A1 Aug. 9, 2007

(51) Int. Cl.
G06F 17/28 (2006.01)
G06F 17/27 (2006.01)
G06F 17/21 (2006.01)
G10L 17/00 (2006.01)
G10L 15/26 (2006.01)
G10L 15/04 (2006.01)
G10L 15/00 (2006.01)
G10L 21/00 (2006.01)

(52) U.S. Cl. ....... 704/9; 704/4; 704/5; 704/10; 704/246; 704/235; 704/251; 704/254; 704/257; 704/270; 704/270.1; 704/275

(58) Field of Classification Search .......... 704/246, 704/254, 257, 1–10, 275, 235, 251, 270, 704/270.1
See application file for complete search history.

(56) References Cited

U.S. PATENT DOCUMENTS

| | | | |
|---|---|---|---|
| 5,109,418 A | 4/1992 | Van Hemert | |
| 5,146,503 A | 9/1992 | Cameron et al. | |
| 5,377,303 A | 12/1994 | Firman | |
| 5,384,892 A | 1/1995 | Strong | |
| 5,454,062 A | 9/1995 | La Rue | |
| 5,469,355 A * | 11/1995 | Tsuzuki | 704/9 |
| 5,475,588 A * | 12/1995 | Schabes et al. | 704/9 |
| 5,664,061 A | 9/1997 | Andreshak et al. | |
| 5,774,851 A | 6/1998 | Miyashiba et al. | |
| 5,794,196 A | 8/1998 | Yegnanarayanan et al. | |
| 5,797,123 A | 8/1998 | Chou et al. | |
| 5,842,163 A | 11/1998 | Weintraub | |
| 5,909,662 A | 6/1999 | Yamazaki et al. | |
| 5,937,385 A * | 8/1999 | Zadrozny et al. | 704/257 |
| 5,950,160 A | 9/1999 | Rozak | |
| 5,995,918 A | 11/1999 | Kendall et al. | |
| 6,064,957 A | 5/2000 | Brandow et al. | |
| 6,067,514 A | 5/2000 | Chen | |

(Continued)

OTHER PUBLICATIONS

H. Ferreira and D. Freitas, "AudioMath: Towards Automatic Readings of Mathematical Expressions," in Human-Computer Interaction International (HCII), Las Vegas,Nevada, USA, 2005.*

(Continued)

*Primary Examiner* — Douglas Godbold
*Assistant Examiner* — Edgar Guerra-Erazo
(74) *Attorney, Agent, or Firm* — Holland & Knight, LLP; Brian J. Colandreo, Esq.; Michael T. Abramson, Esq.

(57) ABSTRACT

There are provided methods and apparatus for linguistic independent parsing and for dynamic learning in natural language systems. A parsing method for a natural language system includes the step of parsing an input phrase to identify at least one source phrase within the input phrase for which replacement phrase synonyms exist. The method further includes the step of substituting the replacement phrase synonyms in place of the identified at source phrase, in descending order by text length, to provide a modified input phrase. The method also includes the step of repeating the parsing and substituting steps until no more source phrases exist or a pre-specified number of times.

23 Claims, 6 Drawing Sheets

U.S. PATENT DOCUMENTS

| | | | |
|---|---|---|---|
| 6,076,060 A | 6/2000 | Lin et al. | |
| 6,094,635 A | 7/2000 | Scholz et al. | |
| 6,138,098 A | 10/2000 | Shieber et al. | |
| 6,173,261 B1* | 1/2001 | Arai et al. | 704/257 |
| 6,272,455 B1 | 8/2001 | Hoshen et al. | |
| 6,279,017 B1* | 8/2001 | Walker | 715/201 |
| 6,279,018 B1* | 8/2001 | Kudrolli et al. | 715/234 |
| 6,289,304 B1* | 9/2001 | Grefenstette | 704/9 |
| 6,336,214 B1* | 1/2002 | Sundaresan | 717/143 |
| 6,374,226 B1 | 4/2002 | Hunt et al. | |
| 6,405,162 B1 | 6/2002 | Segond et al. | |
| 6,405,170 B1 | 6/2002 | Phillips et al. | |
| 6,430,531 B1 | 8/2002 | Polish | |
| 6,434,523 B1* | 8/2002 | Monaco | 704/257 |
| 6,442,522 B1 | 8/2002 | Carberry et al. | |
| 6,453,284 B1 | 9/2002 | Paschall | |
| 6,466,907 B1 | 10/2002 | Ferrieux et al. | |
| 6,499,013 B1 | 12/2002 | Weber | |
| 6,591,236 B2 | 7/2003 | Lewis et al. | |
| 6,604,094 B1 | 8/2003 | Harris | |
| 6,647,383 B1 | 11/2003 | August et al. | |
| 6,658,022 B1 | 12/2003 | West et al. | |
| 6,658,627 B1 | 12/2003 | Gallup et al. | |
| 6,801,897 B2* | 10/2004 | Kist et al. | 704/275 |
| 6,871,179 B1 | 3/2005 | Kist et al. | |
| 6,928,407 B2 | 8/2005 | Ponceleon et al. | |
| 7,031,908 B1* | 4/2006 | Huang et al. | 704/9 |
| 7,099,809 B2* | 8/2006 | Dori | 703/6 |
| 7,231,343 B1* | 6/2007 | Treadgold et al. | 704/9 |
| 7,392,174 B2* | 6/2008 | Freeman | 704/9 |
| 7,464,032 B2* | 12/2008 | Wang | 704/251 |
| 7,739,102 B2* | 6/2010 | Bender | 704/9 |
| 2002/0032564 A1* | 3/2002 | Ehsani et al. | 704/235 |
| 2002/0087328 A1* | 7/2002 | Denenberg et al. | 704/275 |
| 2002/0099535 A1* | 7/2002 | Schmid et al. | 704/4 |
| 2002/0138248 A1* | 9/2002 | Corston-Oliver et al. | 704/1 |
| 2002/0156616 A1* | 10/2002 | Russell | 704/4 |
| 2002/0169595 A1* | 11/2002 | Agichtein et al. | 704/9 |
| 2002/0194223 A1 | 12/2002 | Meyers et al. | |
| 2003/0050772 A1* | 3/2003 | Bennett | 704/9 |
| 2003/0130976 A1 | 7/2003 | Au | |
| 2003/0144831 A1 | 7/2003 | Ford | |
| 2004/0006459 A1* | 1/2004 | Dehlinger et al. | 704/10 |
| 2004/0006470 A1 | 1/2004 | Kobayashi | |
| 2004/0064304 A1* | 4/2004 | Dehlinger et al. | 704/9 |
| 2004/0122979 A1* | 6/2004 | Kirkland | 709/247 |
| 2004/0181390 A1 | 9/2004 | Manson | |
| 2004/0205737 A1 | 10/2004 | Margaliot et al. | |
| 2005/0071170 A1 | 3/2005 | Comerford | |
| 2005/0105712 A1 | 5/2005 | Williams et al. | |
| 2005/0171775 A1 | 8/2005 | Doyle | |
| 2006/0018551 A1* | 1/2006 | Patterson | 382/229 |
| 2006/0020607 A1* | 1/2006 | Patterson | 707/100 |
| 2006/0025091 A1* | 2/2006 | Buford | 455/154.2 |
| 2006/0031195 A1* | 2/2006 | Patterson | 707/3 |
| 2006/0100854 A1* | 5/2006 | Ance et al. | 704/9 |
| 2006/0294155 A1* | 12/2006 | Patterson | 707/200 |

OTHER PUBLICATIONS

Don Chamberlin, Daniela Florescu, Jonathan Robie, Jrme Simon, and Mugur Stefanescu. XQuery: A Query Language for XML W3C working draft. Technical Report WD-xquery-20010215, World Wide Web Consortium, Feb. 2001.*

Knight et al. "Statistics-Based Summarization—Step One: Sentence Compression". In Proceedings of the 17th National Conference on Artificial Intelligence, Austin, 2000.*

* cited by examiner

| Source Phrase | Replacement Phrase |
|---|---|
| Let's Get Started | Email my assistant. List appointments. Show morning paper. Log on to trading system. |
| Email my assistant | Create and email to my assistant. Subject is I am at my desk. Send email |
| List Appointments | Speak today's Appointments. |
| Show morning paper. | Show My City Daily |
| Log on to trading system | Launch trading system application and log on to trading system. |
| My assistant | <email.recipient jane.doe@mycompany.com> |

FIG. 6

| Commands | Markup Language |
|---|---|
| Create an email | <email.create> |
| Subject is | <email.subject.define> |
| Send email | <email.send> |
| Speak | <currentoutput=speaker> |
| Show | <curentoutput=currentscreen> |
| Today's | <time=day(now)> |
| Appointments | <currentapplication=calendar> |
| My city daily | <inet=www.mydailyjournal.com> |
| Launch | <currentapplication.start> |
| Trading system | <currentapplication = tradingapplication> |
| Log on to trading system | <currentapplication.logon username=jsmith password = mypassword> |

FIG. 7

METHOD AND APPARATUS FOR LINGUISTIC INDEPENDENT PARSING IN A NATURAL LANGUAGE SYSTEMS

FIELD OF THE INVENTION

The present invention relates generally to natural language systems and, more particularly, to linguistic independent parsing in natural language systems.

BACKGROUND OF THE INVENTION

Much work has been done in the past decades in the speech recognition and natural language understanding (NLU) fields, with one goal that a computer understand and/or react to the content of an utterance by a human. The corresponding methods used to date are linguistic dependant and do not utilize the real advantages of the computer, which include the ability to store a significant amount of information, the ability to quickly retrieve individual references from a large body of stored information, and the ability to quickly perform calculations.

The application of dictation mode NLU systems and command based systems seems to be confined to the arena of automated attendants and automation of visual applications. For example, the Speech Application Language Tags (SALT) standard assumes a person is looking at a screen and simply wants to find a vocal way to select a choice on the screen instead of using a keyboard or mouse. However, it would be desirable and highly advantageous to have truly auditory computer applications which can be used by the average novice, non-technical person without the use of any visual or pointing device present, unless they specifically choose to view a picture, technical drawing or other object which "must be seen to be appreciated".

SUMMARY OF THE INVENTION

These and other drawbacks and disadvantages of the prior art are addressed by the present invention, which is directed to linguistic independent parsing in natural language systems.

According to an aspect of the present invention, there is provided a parsing method for a natural language system. The method includes the step of parsing an input phrase to identify at least one source phrase within the input phrase for which replacement phrase synonyms exist. The method further includes the step of substituting the replacement phrase synonyms in place of the identified source phrase, in descending order by text length, to provide a modified input phrase. The method also includes the step of repeating the parsing and substituting steps until no more source phrases exist or a pre-specified number of times.

According to another aspect of the present invention, there is provided a parsing method for a natural language system. The method includes the step of parsing an input phrase to identify commands therein. The method further includes the step of replacing the identified commands with language tags associated with the identified commands, in ascending order by text length. The associated language tags correspond to a predefined library of functions in a target application program.

According to yet another aspect of the present invention, there is provided an apparatus for parsing an input phrase in a natural language system. The apparatus includes a replacement phrase synonym mapper and a parser. The replacement phrase synonym mapper is configured to map at least one word or phrase to at least one replacement phrase synonym. The parser is in signal communication with the replacement phrase synonym mapper, and is configured to parse the input phrase to identify at least one word or phrase in the input phrase for which replacement phrase synonyms exist, substitute the replacement phrase synonyms in place of the identified at least one word or phrase in descending order by text length to provide a modified input phrase, and repeat the parsing and the substituting until no source phrase exist or a pre-specified number of times.

According to a further aspect of the present invention, there is provided an apparatus for parsing an input phrase in a natural language system. The apparatus includes a language tag mapper and a parser. The language tag mapper is configured to map commands-to-associated-language-tags. The parser is in signal communication with the language tag mapper, and is configured to parse an input phrase to identify commands therein, and to replace the identified commands with language tags associated with the commands in ascending order by text length. The associated language tags correspond to a target application program.

According to a yet further aspect of the present invention, there is provided a dynamic learning method for a natural language system. The method includes the step of detecting a new command indicator in an input phrase. The new command indicator is configured to indicate a presence of a new user-defined command in the input phrase and to facilitate parsing of the new user-defined command from the input phrase. The method further includes the step of utilizing the new command indicator to extract the new user-defined command from the input phrase for further processing.

According to an additional aspect of the present invention, there is provided a dynamic learning apparatus for a natural language system. The apparatus includes a language tag mapper and a parser. The language tag mapper is for mapping commands-to-associated-language-tags. The parser is in signal communication with the language tag mapper, and is configured to detect a new command indicator in the input phrase. The new command indicator is for indicating a presence of a new user-defined command in the input phrase and for facilitating parsing of the new user-defined command from the input phrase. The parser is further configured to utilize the new command indicator to extract the new user-defined command from the input phrase for further processing.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which:

FIG. 6 is a diagram illustrating a synonyms table, according to an illustrative embodiment of the present invention; and FIG. 7 is a diagram illustrating a commands table, according to an illustrative embodiment of the present invention.

DETAILED DESCRIPTION

Figure 1:
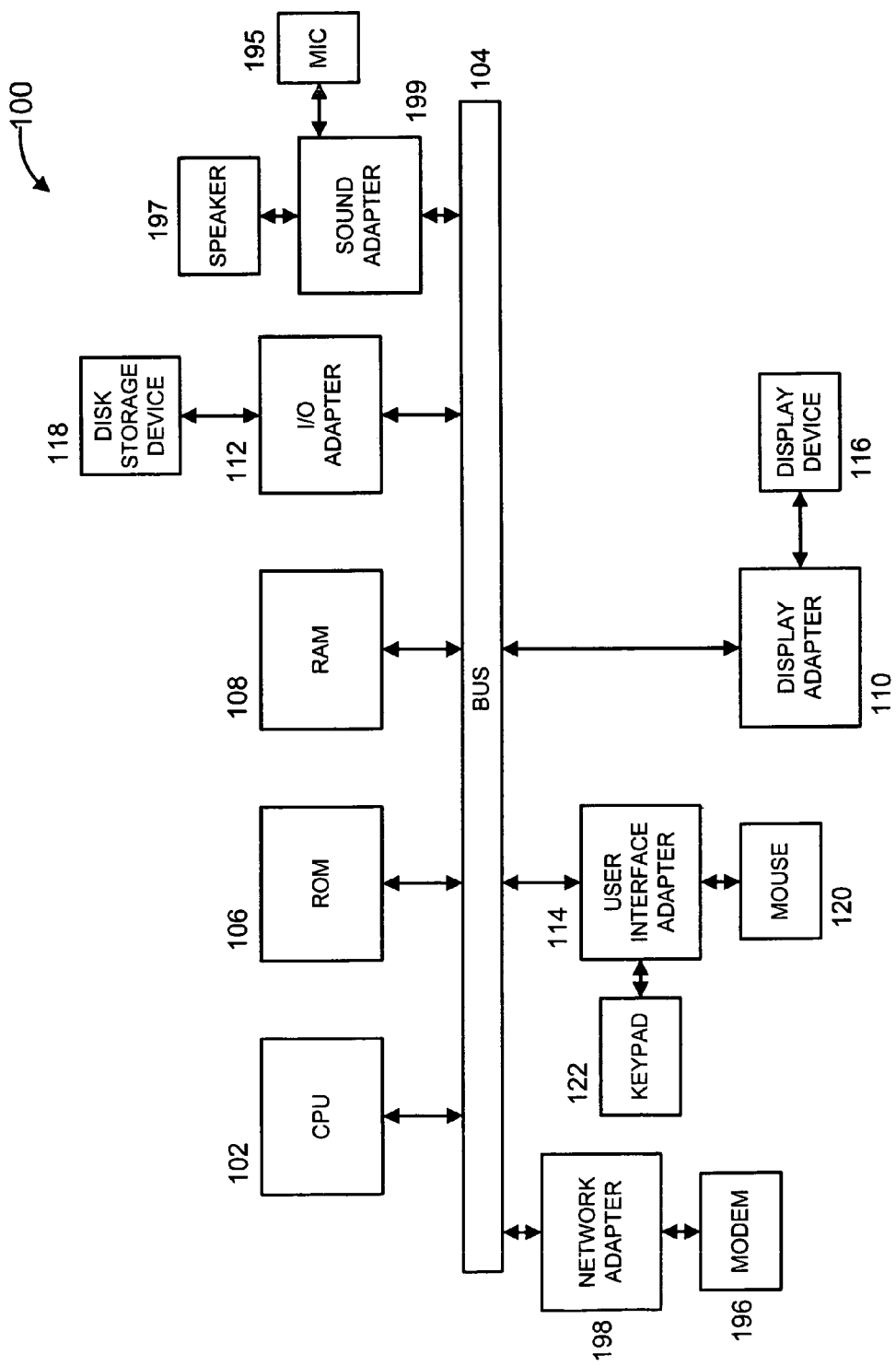
FIG. 1 is a block diagram illustrating an exemplary computer processing system 100 to which the present invention may be applied, according to an illustrative embodiment of the present invention.

The present invention is directed to linguistic independent parsing in natural language systems. Advantageously, systems and methods are provided herein for parsing and translating a user input into a target computer language. The user input may be spoken and/or written, and may be provided in any language. The target language may be any target computer language including, but not limited to, eXtensible Markup Language (XML), Web Services Description Language (WSDL) or Speech Application Language Tags (SALT). The target computer language may then be forwarded to one or more target applications for further processing.

The present invention may be utilized, for example, in implementations involving speech recognition and/or computer applications that are to be controlled and/or interacted with using "natural language" or "free format" commands in dictation mode. Moreover, the present invention advantageously allows the issuer of a spoken or written command to invent their own language on the fly and teach the corresponding system what is the intent of each command, so the next time the user issues the proprietary command, the system will react accordingly, regardless of any "formal" linguistic rules which might otherwise impede such use.

Moreover, the systems and methods may be implemented to include a dynamic learning mechanism to dynamically create new commands that include one or more existing commands. This feature provides improved accuracy in any voice-driven system.

While the systems and methods provided herein may be used without other language disambiguation components to process computer commands from a stream of text in dictation mode, they can also be used in a system/method which includes other natural language and/or word/command spotting components, as a linguistic independent dynamic grammar engine with dynamic learning capability.

It is to be appreciated that the present invention does not include or utilize fuzzy search technology, linguistic specific grammatical rules or artificial intelligence. The present invention provides an advantage where the context of a voice application is restricted to a finite set of applications installed on a device such as a desktop or handheld computer. In context specific voice applications such as Personal Digital Assistants (PDAs) and cell phones, where the processing power and/or storage capacity are limited (e.g., thin devices), the present invention provides linguistics independent language disambiguation capabilities in a highly efficient manner, in contrast to a full-blown general use linguistic dependent language interpretation system. These and other features and advantages will become apparent to one of ordinary skill in this and related arts, given the teachings provided herein.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Turning to FIG. 1, an exemplary computer processing system 100 to which the present invention may be applied is indicated generally by the reference numeral 100. The computer processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, a sound adapter 199, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 114. The mouse 120 and keyboard 122 are used to input and output information to and from system 100.

At least one speaker (herein after "speaker") 197 and at least one microphone (herein after "microphone") 195 are operatively coupled to system bus 104 by sound adapter 199.

A (digital and/or analog) modem 196 is operatively coupled to system bus 104 by network adapter 198.

It is to be appreciated that the present invention is not limited to the system 100 shown and FIG. 1 and, thus, other computer processing systems and other configurations thereof may also be employed given the teachings provided herein, while maintaining the scope of the present invention. For example, the present invention may be implemented on a computer processing system that includes only an audio interface for a user. In such a case, visual related interface elements including, for example, any of the display device 116, the mouse 120, and the keyboard 122 may be omitted.

Figure 2:
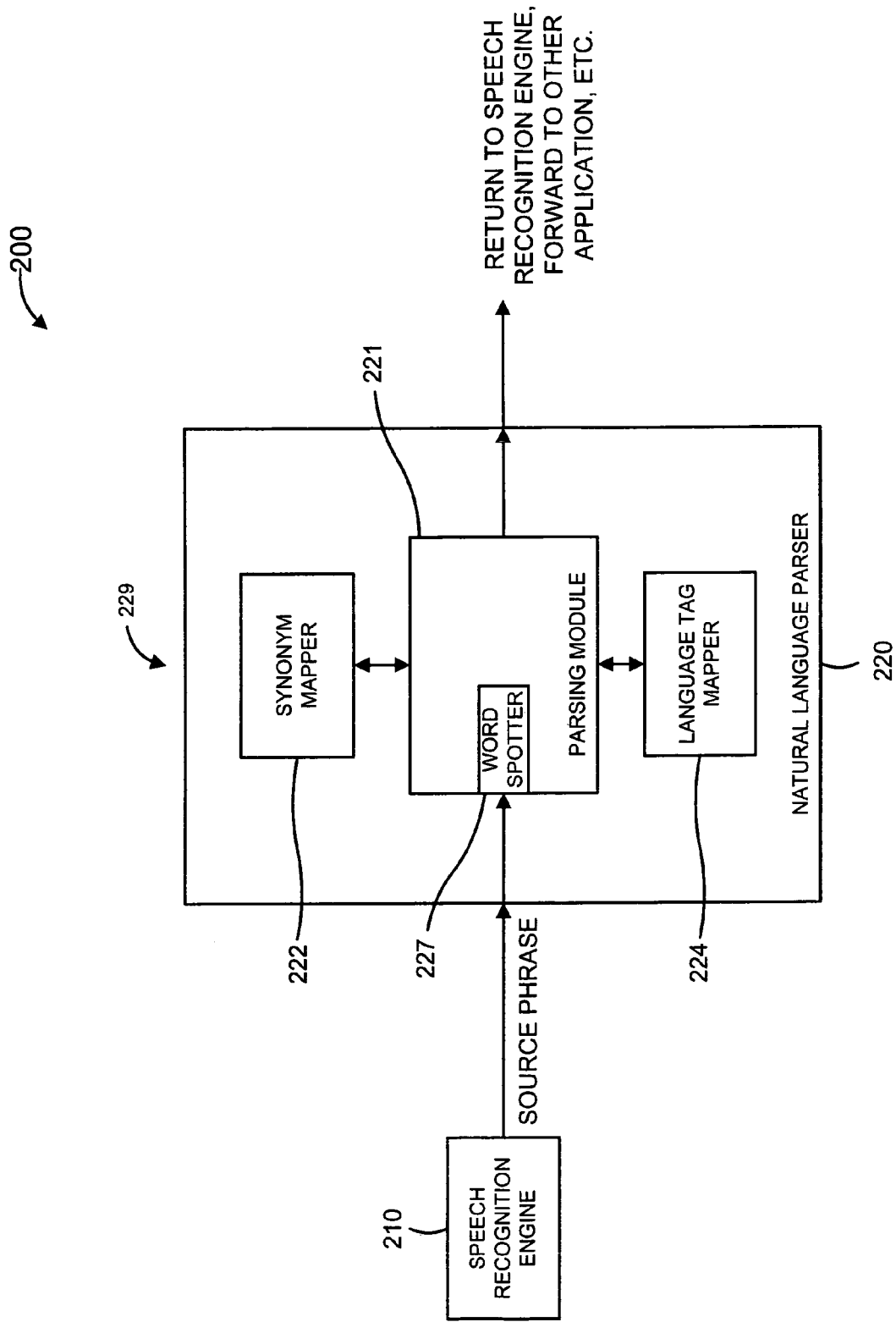
FIG. 2 is a block diagram illustrating an exemplary architecture 200 for a natural language system in computer processing system 100, according to an illustrative embodiment of the present invention.

Turning to FIG. 2, an exemplary architecture for a natural language system in computer processing system 100 is indicated generally by the reference numeral 200.

The natural language system 200 includes, as a front-end, a speech recognition engine 210. The speech recognition engine 210 receives a speech utterance (an input phrase) from a user, and decodes (recognizes) the uttered speech to output a transcription thereof. The output of the speech recognition engine 210 is provided to a natural language parser 220.

The natural language parser 220 includes a parsing module 221, a replacement phrase synonym mapper 222, and a language tag mapper 224. The replacement phrase synonym mapper 222 maps source phrases within the input phrase to corresponding replacement phrase synonyms. The language tag mapper 224 maps commands (words and/or phrases) to corresponding language tags. The output of the language tag mapper 224 may be provided to, for example, the speech recognition engine 210 (as, e.g., a grammar file), or to an application with which the user wishes to interact or otherwise use. Accordingly, the format of the output of the language tag mapper 224 is application dependent, and may be tailored accordingly for use with any application. The functions of the replacement phrase synonym mapper 222 and the language tag mapper 224 are further described herein below, e.g., with respect to FIG. 3.

It is to be appreciated that the parsing module 221, the replacement phrase synonym mapper 222, and the language tag mapper 224 may be considered to form a dynamic learning module 229. The dynamic learning module 229 is capable of learning new user-defined commands. Such learning is facilitated by the use of a new command indicator that indicates the presence of a new user-defined command in an input phrase. Moreover, the new command indicator may also facilitate parsing of the input phrase to extract the new user-defined command therefrom. This may be accomplished, for example, by indicating at least one of a starting and an ending position of the new user-defined command. An existing set of mappings may be modified to include a new mapping for the new user-defined command. In this way, subsequent utterances of the new user-defined command may be recognized. This dynamic learning capability of the present invention is further described below, particularly with respect to the When I Say I Mean (WISIM) approach described herein. It is to be appreciated that other configurations of self-learning module 229 may also be utilized while maintaining the scope of the present invention.

It is to be further appreciated that the parsing module 221 may include a word spotter 227 for detecting a new command indicator in an input phrase. The new command indicator is described in further detail herein below, e.g., with respect to FIG. 4.

The present invention advantageously provides systems and methods for efficiently identifying system commands in, e.g., a dictation mode of a natural language understanding (NLU) system. It is to be noted that much of natural language understanding relates to how language should be used, whether we refer to the constraints imposed by proper technical use or those imposed by grammatical rules. A user must learn how to correctly, precisely state a given command to get a desired result. The WISIM approach described herein allows a user to issue a command just about any way the user chooses. A basis of the WISIM approach is that a computer can store many ways to say a command and can quickly find a single command from a selection of thousands.

An elemental object in the WISIM dictionary is a command/language tag pair. A specific command, e.g., "send an e-mail" is paired with its associated tag, e.g., <email.create>. It is to be appreciated that the format of the language tags depend upon the target machine language (XML, SALT, WSDL, and so forth).

Another form of an object in the WISIM dictionary is a replacement phrase synonym object. A synonym object is a pairing of a source phrase contained within a "user input phrase") and replacement phrase synonym. For example, in the preceding example above, the source phrase "email" is paired with the replacement phrase synonym "send an e-mail". Such a pairing allows a user to issue the command "email John Smith", instead of the more formal "send an e-mail to John Smith".

Moreover, a replacement phrase synonym object may be a source phrase for another replacement phrase synonym or group of replacement phrases synonyms. For example, the source phrase "Let's get started" might be paired with a replacement phrase synonym such as "send an email to my secretary to tell her I am here. Read urgent emails. List this morning's tasks". This would allow the user to complete a range of tasks by issuing one command. Alternatively, such pairings may be used for purely technical reasons to improve usability. For example, a source phrase-to-replacement phrase synonym conversion such as "the" and "" (where "" is a null replacement phrase) may be utilized whereby all occurrences of the word "the" are removed, so that a phrase such as, e.g., "read the email" becomes "read email". The value of the proposed methodology is in how the fundamental mechanisms described herein can be used to create quite complex translations of user intent and ideas into computer instructions.

Figure 3:
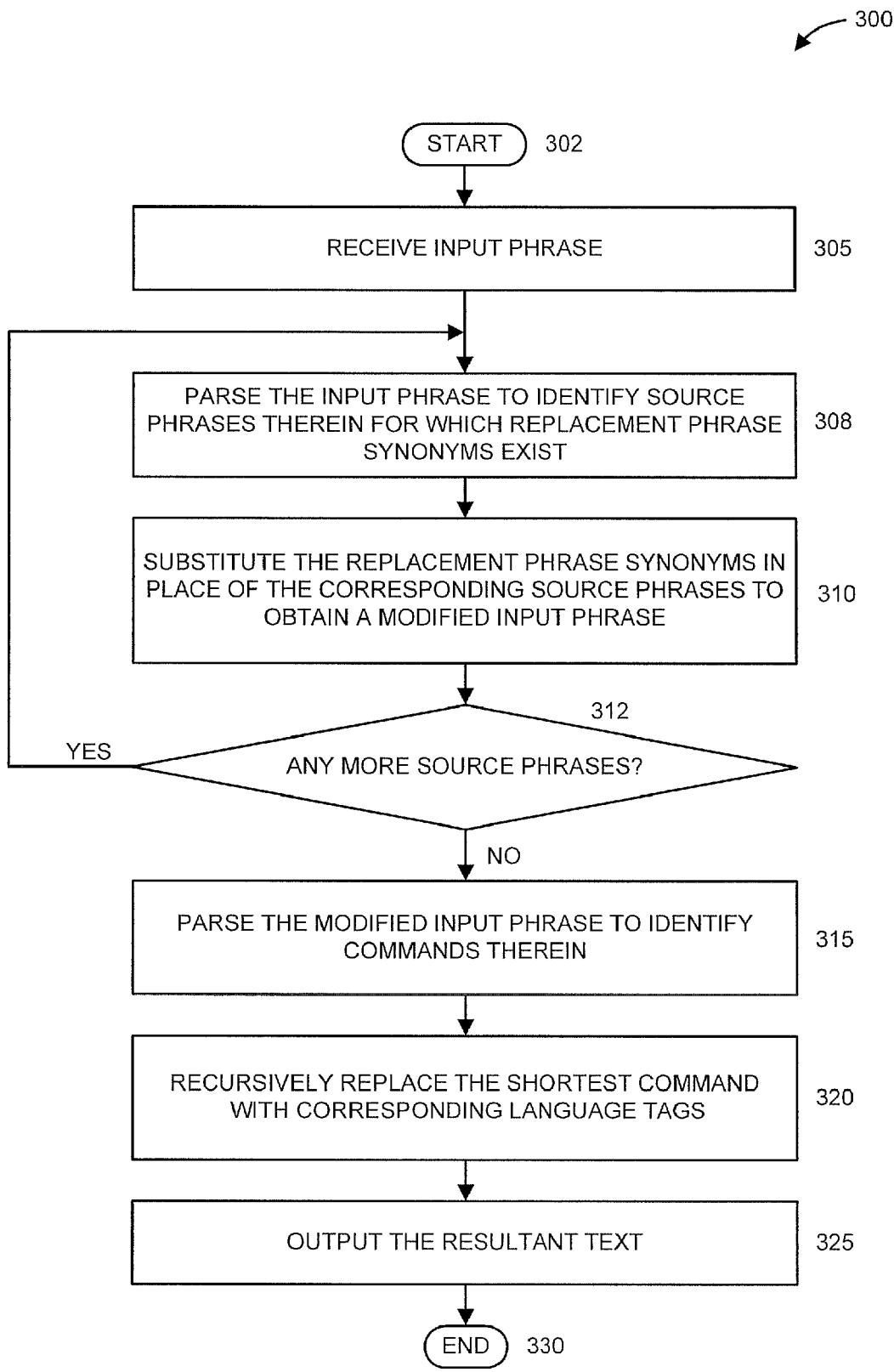
FIG. 3 is a flow diagram illustrating an exemplary method 300 for parsing an input phrase in a natural language system, according to an illustrative embodiment of the present invention.

Turning to FIG. 3, a method for parsing an input phrase in a natural language system is generally indicated by the reference numeral 300.

A start block 302 passes control to a function block 305. The function block 305 receives an input phrase, and passes control to a function block 308. The function block 308 parses the input phrase to identify one or more source phrases therein for which replacement phrase synonyms exist, and passes control to a function block 310. The function block 310 substitutes or replaces the replacement phrase synonyms in place of the identified source phrases of greatest text length to obtain a modified input phrase, and passes control to a decision block 312. The decision block 312 determines whether or not any more source phrases exist in the modified input phrase. If so, then control is returned to function block 308. Otherwise, control is passed to a function block 315. It is to be appreciated that the return of control to function block 308 results in the possible identification of "replacement phrase synonyms of for replacement phrase synonyms" or "replacement phrase synonyms for partial replacement phrase synonyms" (i.e., the identification of a new source phrase after the substitution of a replacement phrase synonym in the input phrase as a result of function block 310). If this is not desired, then, in another embodiment, control may be passed from function block 310 to function block 315 without use of decision block 312 (e.g., upon a first-pass on the source phrase and resultant replacement phrase synonym substitution therefore).

The function block 315 parses the resultant modified input phrase to identify commands (word and/or phrases) therein, and passes control to a function block 320. The function block 320 substitutes or replaces the commands with corresponding language tags, recursively, in ascending order by text length of the commands found, and passes control to a function block 325. The function block 325 outputs the resultant text, and passes control to an end block 330. The output text from function block 325 may be passed to, e.g., a target application.

It is to be appreciated that in one embodiment, function block 310 may optionally perform the substitutions in descending order by text length of the source phrases and/or the replacement phrases. This option ensures that larger context phrases are substituted first, before shorter phrases. For example, "send the result to shipping" might be a valid command, whereas "send the result to shipping when the new order is processed" might also be a valid command. The longer sentence is of more importance since it infers the more specific context by adding a time constraint, so this phrase should be processed first and the shorter phrase may be ignored. Without this option, a corresponding system might obey the first command since it was completed before the more specific command was issued.

Moreover, it is to be appreciated that in one embodiment, function block 320 may optionally perform the substitutions in ascending order by text length of the commands and/or the corresponding language tags.

It is to be further appreciated that the input phrase may be in a non-formal language. That is, the input phrase may not necessarily be in a specific language, but may incorporate one or more known languages and one or more proprietary words/phrases/commands, that may not necessarily follow established rules of grammar and so forth. In such a case, the dynamic learning capability of the present invention may be used to define new commands and to recognize these new commands. For example, just for fun, a user might create a replacement phrase synonym for the source phrase "what's for din din mommy" and the replacement phrase synonym "read page www.localrestaurant.com/specials.htm". Similarly, a sports fan might wish to train their machine to react to the phrase "Go team." Also, professionals might employ industry specific jargon to control their machine, such as a Foreign Exchange Financial trader saying "Sterling up 10 2 bar" to instruct the machine to "issue a market bid for 200,000 British Pounds at .10 pence above the current best bid price."

As noted above, meaning in a computer system is generally constrained by the capabilities of the installed applications. Moreover, it is proposed that in a computer system, all utterances should be regarded as intended for the application. Of course, this may not apply in an "open-microphone" situation. Thus, it is presumed that all utterances are generally relevant to the system and should include valid commands.

The present invention may be trained in several ways including, but not limited to: (1) via formal training sessions; and (2) by using the WISIM command phrase "When I Say I Mean."

One way in which training may be performed involves a training session that goes through the valid commands in the database, invites a user to say each valid command a number of times, and then store any new synonyms (or mispronunciations) that occur during the training. For example, in an email system, the program may prompt the user as follows: "please state the command you wish to use to send an email?" The user might respond "send an email" or "email" or "write to" or something fun like "yo!" or "dude". Whatever phrases the user inputs, will be "understood" by the system as create a new email.

Further training may involve a user creating their own "macro" commands using the WISIM approach. For example, the user might say "When I say 'good morning', I mean 'read my email, read my task list, launch MICROSOFT WORD, launch INSTANT MESSENGER'".

Figure 4:
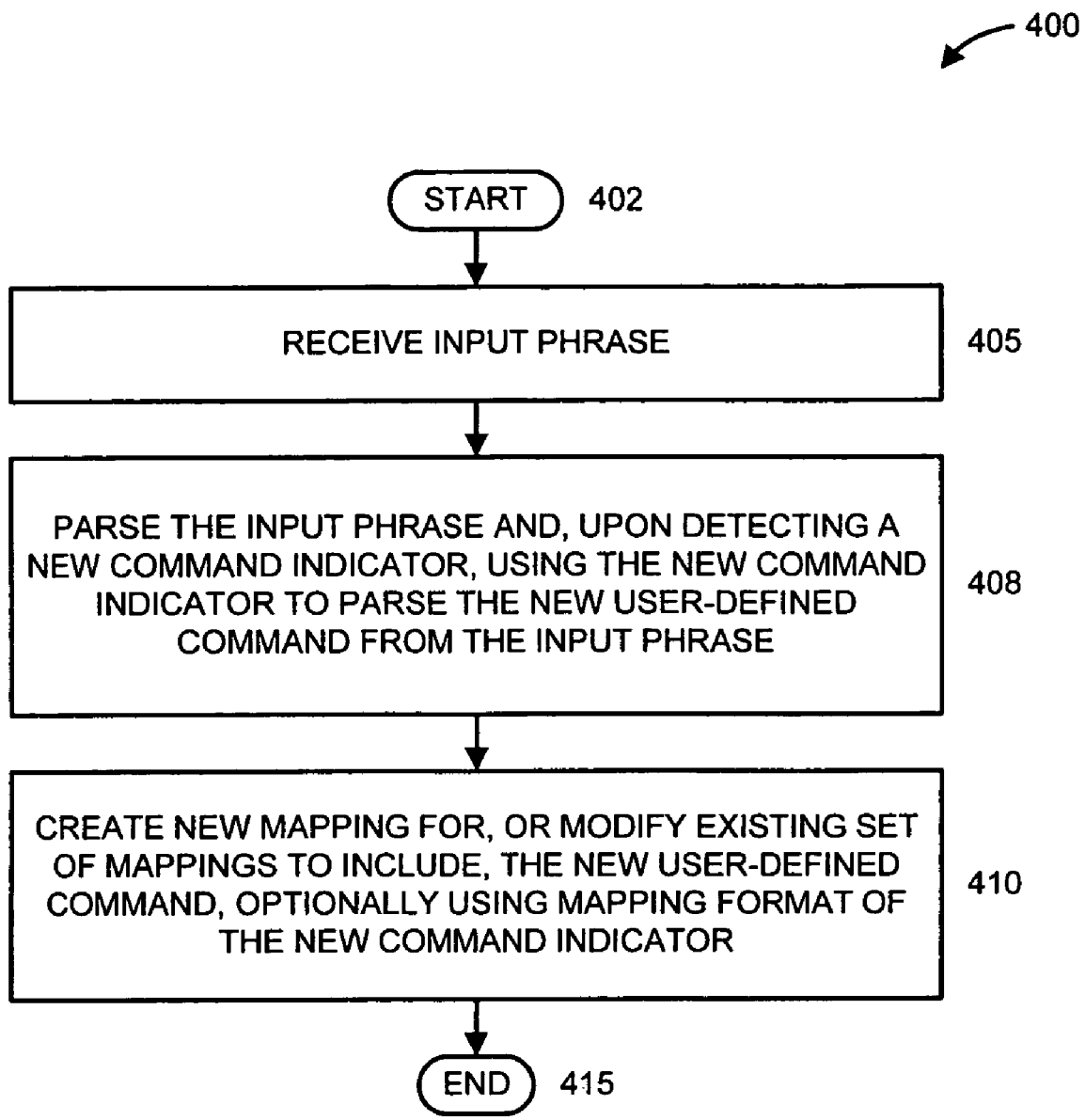
FIG. 4 is a flow diagram illustrating a method for introducing a new command in a natural language system, according to an illustrative embodiment of the present invention.

Turning to FIG. 4, a method for introducing a new command in a natural language system is indicated generally by the reference numeral 400. The method 400 relates to the approach referred to herein as the "When I Say I Mean" (WISIM) approach. It is to be appreciated that as used herein, a new command may include, but is not limited to, a command never yet encountered by the corresponding system in which the present invention is practiced, or a word or phrase to be used to label (or re-label) one or more commands associated with each other to form a set of commands. Thus, in some cases, a new command may correspond to a re-labeling of an existing command, or may be used to form a macro (command set).

A start block 402 passes control to a function block 405. The function block 405 receives the input phrase, and passes control to a function block 408. The function block 408 parses the input phrase and, upon encountering a new command indicator in the input phrase ("When I say") that indicates that the input phrase corresponds to a new user-defined command in the format "When I Say" <source phrase>"I Mean" <replacement phrase>, passes control to a function block 410. The function block 410, in response to the new command indicator, creates a new mapping for, or modifies an existing set of mappings to include, the new user-defined command, and passes control to an end block 415.

It is to be appreciated that the new command indicator, in addition to indicating that the input phrase includes a new user-defined command, is configured to have a format that maps the new command to at least one other command. The other command may be one or more existing commands and/or one or more commands yet to be defined and/or one or more source phrases to be later converted to corresponding commands (e.g., by function blocks 315 and 320 of the method of FIG. 3). For example, if the new command indicator is "When I Say I Mean" (WISIM), then a user might say, to use the example above, "when I say good morning I mean read my email, read my task list, launch MICROSOFT WORD, launch INSTANT MESSENGER". Here, the user has picked the phrase "good morning" to form a macro that includes reading the user's email, reading the user's task list, launching MICROSOFT WORD, and launching INSTANT MESSENGER. Thus, the input phrase "good morning" is mapped to all of the preceding tasks by the new command indicator itself. The function block 410 may use this mapping of the command indicator to form its own mapping or to modify an existing mapping.

It is to be further appreciated that in a subsequent session, the mapping created at function block 410 is used to identify (recognize) the new user-defined command. Such identification may be performed, for example, with respect to e.g., a parsing step such as that performed by function blocks 305 and 315 of the method 300 of FIG. 3.

Moreover, it is to be appreciated that the present invention is not limited to only the preceding new command indicator (i.e., When I Say I Mean) described herein and, thus, other new command indicators may also be utilized in accordance with the principles of the present invention while maintaining the scope thereof. For example, for any new command indicator, it is preferable that, at the least, the new command indicator can be used in a parsing step to parse a new user-defined command from an input phrase by simply providing an indication (by the fact that the new command indicator is present) that a new user-defined command is included in the input phrase. However, it is also preferable that the new command indicator further provide, in addition to the above described indication, at least one of a start boundary and an end boundary of the new user-defined command within the input phrase. Thus, the new command indicator may be used to parse the input phrase by, e.g., using the new command indicator to define the parsing boundaries for any newly introduced words and/or phrases. For example, if the new command indicator is "When I Say I Mean", then the words "say" and the second "I" form a boundary set where the words in between "say" and the second "I" are the new command, and the words after "mean" are the words to be mapped to the new command. Thus, in the case, where a made-up word is used to mean many different known commands, indicating the boundaries of the made-up word or phrase allows it to be properly detected and processed as described herein. Given the teachings of the present invention provided herein, these and other features of a new command indicator to be used in accordance with the principles of the present invention may be readily determined by one of ordinary skill in this and related arts.

Figure 5:
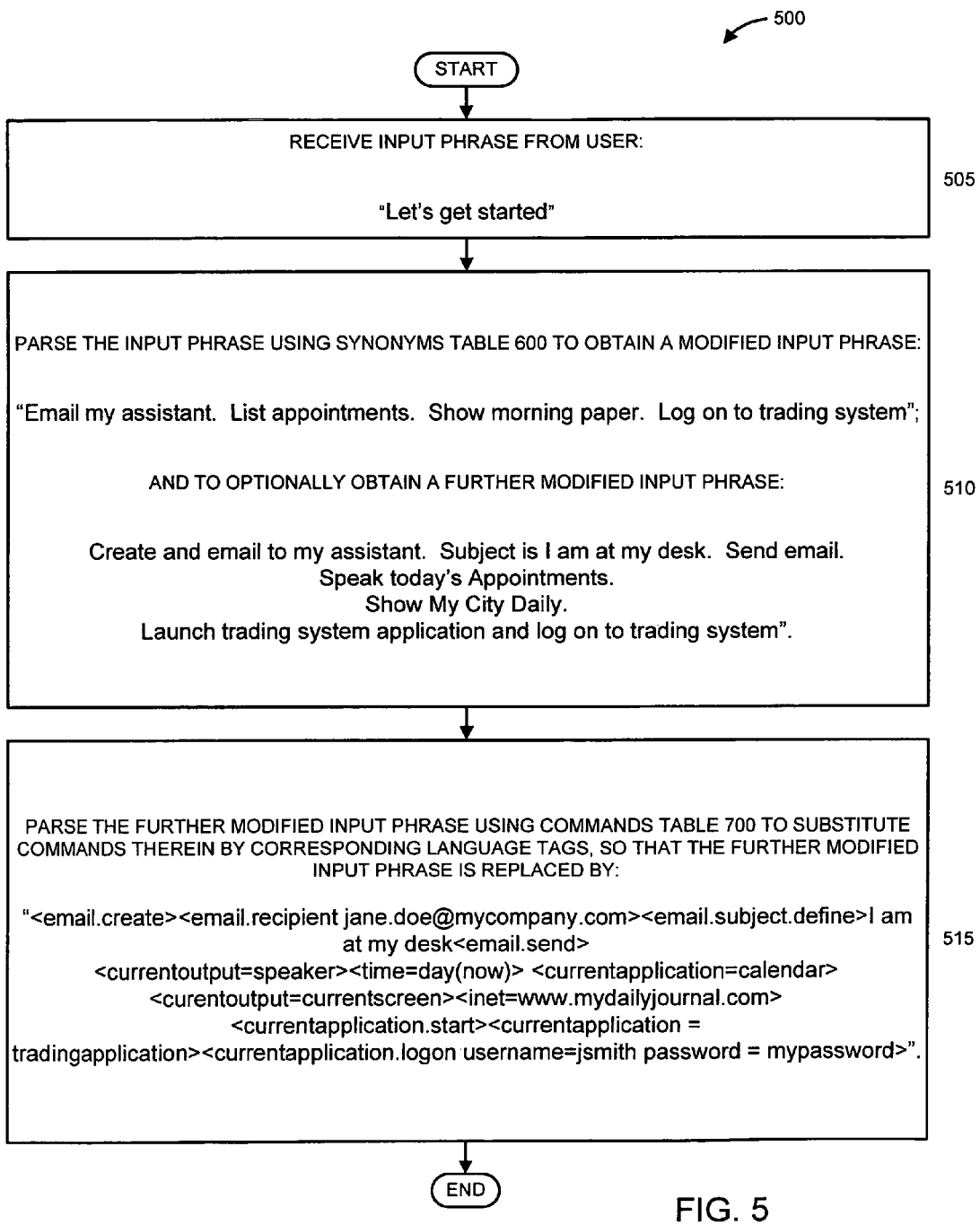
FIG. 5 is a flow chart illustrating a parsing of an exemplary input phrase in a natural language system, according to an illustrative embodiment of the present invention.

Turning to FIG. 5, a parsing of an exemplary input phrase is indicated generally by the reference numeral 500. The parsing 500 is performed in accordance with the method 300 of FIG. 3 and is described generally to provide an example of the same for the sake of clarity and illustration. Turning to FIGS. 6 and 7, a replacement phrase synonyms table and a commands table are respectively indicated by the reference numerals 600 and 700. The tables 600 and 700 are utilized for the example described with respect to FIG. 5.

It is to be appreciated that the replacement phrase synonyms table 600 and the commands table 700 may be respectively used by the replacement phrase synonym mapper 222 and the language tag mapper 224 shown and described with respect to FIG. 2. It is to be further appreciated that, given the teachings of the present invention provided herein, other table configurations and other data structures other than tables may be used by the replacement phrase synonym mapper 222 and the language tag mapper 224 to perform the functions described herein while maintaining the spirit of the present invention.

In the example of FIG. 5, the phrase "Let's get started" is received from a user (Step 505). This phrase is considered the input phrase.

The input phrase is parsed by the replacement phrase synonym mapper 222 using the replacement phrase synonyms table 600 to obtain a modified input phrase (wherein source phrases are replaced by corresponding replacement phrase synonyms) (step 510). Thus, the input phrase is replaced by the modified input phrase "Email my assistant. List appointments. Show morning paper. Log on to trading system". Moreover, the modified input phrase may be replaced by the further modified input phrase:

"Create an email to my assistant. Subject is I am at my desk. Send email.

Speak today's Appointments.

Show My City Daily.

Launch trading system application and log on to trading system".

The further modified input phrase is parsed by the language tag mapper 224 using the commands table 700 to substitute commands therein by corresponding language tags (step 515). Thus, the further modified input phrase is replaced by:

"<email.create><email.recipient jane.doe@mycompany.com><email.subject.define>I am at my desk<email.send>

<currentoutput=speaker><time=day(now)>

<currentapplication=calendar>

<curentoutput=currentscreen>

<inet=www.mydailyjournal.com>

<currentapplication.start><currentapplication= tradingapplication><currentapplication.logon username=jsmith password=mypassword>".

A description will now be given of some of the many attendant advantages and features of the present invention. One advantage/feature is freedom for the user in how they can control their computer-based application. Another advantage/feature is an increase in the capability of any natural language system utilized in accordance with the principles of the present invention. Such a natural language system may use job specific or user profile specific language libraries (jargon). Rather than being constrained to a particular technical or spoken language, the user may use non-technical terms or colloquialisms or even create their own pseudo language on the fly and have their computer react accordingly. In one embodiment, a user may load and maintain collections of application specific jargon (leisure activities, job activities, and so forth). Moreover, the WISIM approach provides a sophisticated macro capability that can empower the user to "program" the computer in an entirely auditory environment, with sophisticated conditional actions and personalized nuances of language use independent of linguistic rules.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A linguistic independent method for parsing in a natural language system, comprising:
    parsing an input phrase with a processor to identify one or more source phrases within the input phrase associated with one or more respective replacement phrase synonyms;
    replacing the one or more source phrases of greatest text length and then a shorter text length with the respective associated replacement phrase synonyms, to provide one or more modified input phrases, wherein the parsing and the replacing are performed independent of linguistic rules; and
    repeating the parsing and the replacing until one of no remaining source phrases exist in the one or more modified input phrases, and a pre-specified number of times.

2. The method of claim 1, wherein the input phrase comprises a single source phrase.

3. The method of claim 1, further comprising maintaining a mapping of the one or more source phrases to the respective associated replacement phrase.

4. The method of claim 1, further comprising:
    after all source phrase replacements are completed, parsing the one or more modified input phrases to identify one or more commands within the one or more modified input phrases; and
    replacing the identified command of shortest text length with an associated language tag to provide the one or more modified input phrases, and repeating the parsing of the one or more modified input phrases and the replacing of the identified command of shortest text length until one of no remaining commands exist in the one or more modified input phrases, and a pre-specified number of times;
    wherein the associated language tag corresponds to a target application program operatively connected to the natural language system.

5. The method of claim 4, wherein the one or more modified input phrases comprise a single identified command.

6. The method of claim 4, further comprising maintaining a mapping of the identified commands to the associated language tag.

7. The method of claim 4, wherein the associated language tag is in a computer markup language.

8. A linguistic independent method for parsing in a natural language system, comprising:
    parsing an input phrase with a processor to identify at least one or more commands therein;
    replacing an identified command of a shortest text length and then a greater text length with language tags associated with the identified command to provide a modified input phrase, the parsing and the replacing performed independent of linguistic rules; and
    repeating the parsing and the replacing until one of no remaining commands exist in the modified input phrase, and a pre-specified number of times;
    wherein the language tag associated with the identified commands corresponds to a predefined library of functions in a target application program operatively connected to the natural language system.

9. The method of claim 8, wherein the input phrase comprises a single identified command.

10. The method of claim 8, further comprising maintaining a mapping of the identified commands to the associated language tags.

11. The method of claim 8, wherein the language tags are in a computer markup language.

12. The method of claim 8, wherein parsing the input phrase comprises:
    detecting a new source phrase indicator in the input phrase, the new source phrase indicator configured to indicate a presence of a new user-defined source phrase in the input phrase and to facilitate parsing of a new user-defined replacement phrase synonym from the input phrase.

13. The method of claim 12, wherein the new source phrase indicator facilitates parsing of the new user-defined source phrase from the input phrase by specifying at least one of a start boundary and an end boundary of the new user-defined source phrase within the input phrase.

14. The method of claim 12, wherein the method further comprises creating a mapping of the new user-defined source phrase to the new user-defined replacement phrase synonym.

15. The method of claim 12, wherein the new source phrase indicator is configured to map the new user-defined source phrase to more than one existing command or to more than one source phrase set, and the input phrase is parsed to extract the new user-defined source phrase and the more than one existing command or source phrase from the input phrase using the mapping format.

16. An apparatus for linguistic independent parsing of an input phrase in a natural language system, comprising:
    a replacement phrase synonym mapper configured to map at least one source phrase to an associated replacement phrase synonym; and
    a processor, in communication with the replacement phrase synonym mapper, when executed, configured to:
        parse the input phrase independent of linguistic rules,
        to identify at least one source phrase within the input phrase associated with a replacement phrase synonym,
        replace a source phrase of greatest text length and then a shorter text length with the respective associated replacement phrase synonyms to provide one or more modified input phrases, and
        repeat the parsing and the replacing until at least one of no source phrases exist in the input phrase, and a pre-specified number of times.

17. The apparatus of claim 16, wherein the input phrase comprises a single source phrase.

18. The apparatus of claim 16, wherein the apparatus is implemented as a linguistic independent dynamic grammar engine with self-learning capability.

19. The apparatus of claim 16, wherein the processor is further configured to parse the one or more modified input phrases to identify at least one command therein, and further configured to replace the identified command with at least one associated language tag, wherein the associated language tag corresponds to a target application program operatively connected to the natural language system.

20. The apparatus of claim 19, wherein the processor is further configured to replace the identified command with the associated language tag in order of shortest text length and then greater text length of the identified command.

21. The apparatus of claim 20, wherein the input phrase comprises a single identified command.

22. The apparatus of claim 19, further comprising a mapper configured to map the command to the associated language tag.

23. The apparatus of claim 19, wherein the language tag is in a computer markup language.

* * * * *